(12) United States Patent
Kodaypak et al.

(10) Patent No.: US 10,492,049 B2
(45) Date of Patent: *Nov. 26, 2019

(54) CORE NETWORK SELECTION FUNCTION IN A RADIO ACCESS NETWORK FOR MACHINE-TO-MACHINE (M2M) COMMUNICATIONS

(71) Applicants: AT&T INTELLECTUAL PROPERTY I, L.P., Atlanta, GA (US); AT&T Mobility II LLC, Atlanta, GA (US)

(72) Inventors: Rajendra Prasad Kodaypak, Sammamish, WA (US); Ye Chen, Milton, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/128,488

(22) Filed: Sep. 11, 2018

(65) Prior Publication Data

US 2019/0014457 A1 Jan. 10, 2019

Related U.S. Application Data

(63) Continuation of application No. 15/660,774, filed on Jul. 26, 2017, now Pat. No. 10,085,109, which is a
(Continued)

(51) Int. Cl.
*H04W 4/00* (2018.01)
*H04W 4/70* (2018.01)
(Continued)

(52) U.S. Cl.
CPC ............ *H04W 4/70* (2018.02); *H04L 65/1069* (2013.01); *H04W 76/10* (2018.02); *H04W 48/17* (2013.01); *H04W 88/08* (2013.01)

(58) Field of Classification Search
CPC combination set(s) only.
See application file for complete search history.

(56) References Cited

U.S. PATENT DOCUMENTS 8,688,123 B2 4/2014 Gao et al.
8,929,306 B2 1/2015 Lee et al.
(Continued)

FOREIGN PATENT DOCUMENTS

| EP | 2466953 | 6/2012 |
|---|---|---|
| EP | 2843994 | 3/2015 |
| GB | 2513896 | 11/2014 |

OTHER PUBLICATIONS

Office Action dated Nov. 15, 2016 for U.S. Appl. No. 14/959,960, 22 pages.
(Continued)

*Primary Examiner* — Justin Y Lee
(74) *Attorney, Agent, or Firm* — Amin, Turocy & Watson, LLP

(57) ABSTRACT

Control plane devices are selected by an access point for establishment of end-to-end control plane for a user equipment (UE) coupled to (or requesting to couple to) the access point. In one aspect, the selection is based on data extracted during the setup and/or registration messages communicated between the access point and UE during attachment of the UE to the access point and/or an internal derived mapping of the control pane devices to the access point. In one example, a control plane device pool is segregated to and different sets
(Continued)

of control plane devices are selected and utilized to handle traffic associated with different services to improve scaling and flexibility.

20 Claims, 11 Drawing Sheets

Related U.S. Application Data continuation of application No. 14/959,960, filed on Dec. 4, 2015, now Pat. No. 9,749,773.

(51) Int. Cl.
  *H04L 29/06* (2006.01)
  *H04W 76/10* (2018.01)
  *H04W 88/08* (2009.01)
  *H04W 48/00* (2009.01)

(56) References Cited

U.S. PATENT DOCUMENTS

| | | | |
|---|---|---|---|
| 8,953,508 B2 | 2/2015 | Zheng et al. | |
| 9,084,241 B2 | 7/2015 | Madan et al. | |
| 9,749,773 B2 * | 8/2017 | Kodaypak | H04L 65/1069 |
| 10,085,109 B2 * | 9/2018 | Kodaypak | H04L 65/1069 |
| 2012/0302196 A1 | 11/2012 | Chin et al. | |
| 2012/0302230 A1 | 11/2012 | Lim et al. | |
| 2013/0070669 A1 | 3/2013 | Haynes et al. | |
| 2013/0195033 A1 | 8/2013 | Koskinen et al. | |
| 2013/0324114 A1 | 12/2013 | Raghothaman et al. | |
| 2014/0078971 A1 | 3/2014 | Bontu et al. | |
| 2014/0148176 A1 | 5/2014 | Raaf et al. | |
| 2015/0009910 A1 | 1/2015 | Ryu et al. | |
| 2015/0045050 A1 | 2/2015 | Sartori et al. | |
| 2015/0146619 A1 | 5/2015 | Xu et al. | |
| 2015/0264677 A1 | 9/2015 | He et al. | |
| 2016/0174120 A1 | 6/2016 | Zembutsu et al. | |

OTHER PUBLICATIONS

Office Action dated Jan. 26, 2018 for U.S. Appl. No. 15/660,774, 31 pages.

* cited by examiner

CORE NETWORK SELECTION FUNCTION IN A RADIO ACCESS NETWORK FOR MACHINE-TO-MACHINE (M2M) COMMUNICATIONS

CROSS-REFERENCE TO RELATED APPLICATION

The subject application is a continuation of, and claims priority to each of, U.S. patent application Ser. No. 15/660,774 (now U.S. Pat. No. 10,085,109), filed Jul. 26, 2017, and entitled "A CORE NETWORK SELECTION FUNCTION IN A RADIO ACCESS NETWORK FOR MACHINE-TO-MACHINE (M2M) COMMUNICATIONS," which is a continuation of U.S. patent application Ser. No. 14/959,960 (now U.S. Pat. No. 9,749,773), filed Dec. 4, 2015, and entitled "A CORE NETWORK SELECTION FUNCTION IN A RADIO ACCESS NETWORK FOR MACHINE-TO-MACHINE (M2M) COMMUNICATIONS," the entireties of which applications are hereby incorporated by reference herein.

TECHNICAL FIELD

The subject disclosure relates to wireless communications, e.g., a core network selection function in a radio access network for machine-to-machine (M2M) communications.

BACKGROUND

The Internet of Things (IoT) holds a great promise for the future of a global communications industry. The connectivity of humans and machines (e.g., smart phones, tablet computers, home appliances, etc.) via high-speed mobile internet technologies such as Long Term Evolution (LTE), LTE-Advanced (LTE-A) and its evolution forms the basis for a successful global IoT implementation.

With projections anywhere from twenty billion to a hundred billion connected things (e.g., machines) by the year 2020, the IoT affects various industries, organizations, companies, and service providers that create the machine-to-machine (M2M) devices, network infrastructure solutions, and end users. Delivering a successful and cost-effective consumer as well as enterprise IoT solutions with a complex connectivity model can pose several challenges. This can affect service provider networks that need to meet such business challenges and commitments. Conventional access networking and core networking technologies have significant shortcomings to meet the growing connectivity demands of M2M devices, for example, to be able to setup faster connections on demand as well as during outage or disaster situations where certain network elements may recover from failure after interruptions.

Conventionally, when a M2M device powers up and needs to connect to the network to obtain a service, the device attaches to an eNodeB (eNB) and then communicates with a Mobility Management Entity (MME) that serves the eNB prior to establishing the session and data connection with a network gateway and/or application server. As the volume of M2M devices in a given serving eNB area grows, the serving MME may not be able to handle the large instantaneous load, resulting in communication failures and/or poor customer satisfaction.

DETAILED DESCRIPTION

Figure 1:
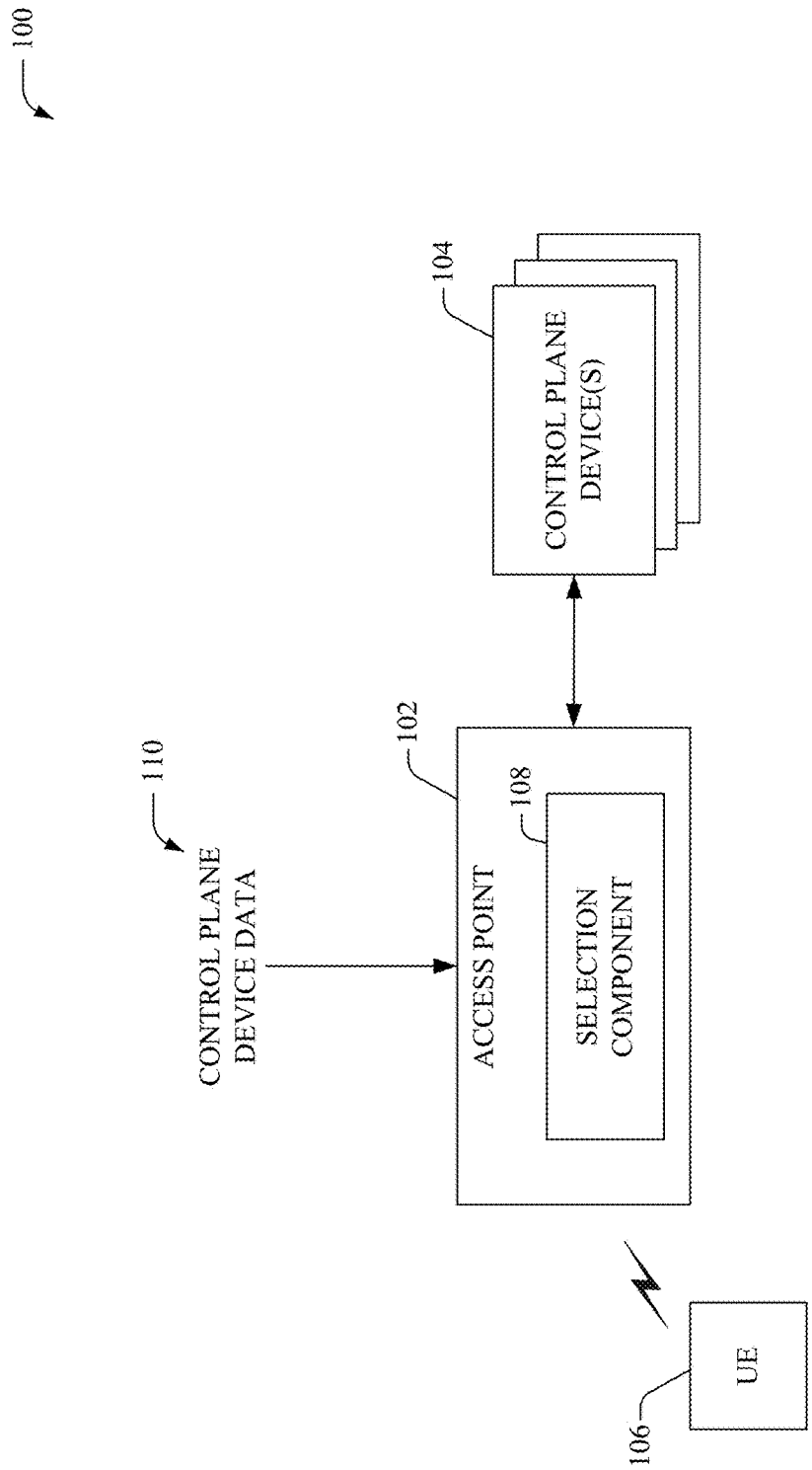
FIG. 1 illustrates an example system that facilitates dynamic control plane node selection for end-to-end control plane establishment.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

Aspects or features of the disclosed subject matter can be exploited in substantially any wired or wireless communication technology; e.g., Universal Mobile Telecommunications System (UMTS), WiFi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Zigbee, or another IEEE 802.XX technology, Fifth generation (5G), etc. Additionally, substantially all aspects of the disclosed subject matter can be exploited in legacy (e.g., wireline) telecommunication technologies.

The systems and methods disclosed herein provide an intelligent approach for targeted Mobility Management Entity (MME) selection from a MME pool for routing traffic received from a user equipment (UE) by an eNodeB (eNB). In one aspect, the eNB can select the MME based on data extracted during the setup messages exchanged between the eNB and UE during attachment of the UE to the eNB and/or based on an internal derived mapping of the MME to the eNB. The disclosed systems and methods significantly simplify MME selection and avoid the overhead associated with a non-access stratum (NAS) layer re-routing functionality proposed by the 3GPP standards Referring initially to FIG. 1, there illustrated is an example system 100 that facilitates dynamic control plane node selection for end-to-end control plane establishment, according to one or more aspects of the disclosed subject matter. As an example, system 100 can be part of a communication network such as a cellular network. In one aspect, an access point 102 can select a control plane device 104 to establish a control plane for a data session associated with a user equipment (UE) 106 coupled to the access point 102. As an example, the control plane devices can include, but are not limited to, an MME and/or a Serving GPRS Support Node (SGSN). Further, the UE 106 can include most any electronic communication device such as, but not limited to, most any consumer electronic device, for example, a tablet computer, a digital media player, a digital camera, a cellular phone, a personal computer, a personal digital assistant (PDA), a smart phone, a laptop, a wearable device (e.g., smart watch, connected glasses, wrist monitor, etc.), a gaming system, etc. Furthermore, the UE 106 can include machine-to-machine (M2M) devices such as, but not limited to, most any LTE-based appliance, machine, and/or device. As an example, M2M devices comprises one or more sensors and/or an radio-frequency identification (RFID) reader, and are typically employed for automated data transmission and/or measurement between mechanical and/or electronic devices. It is noted that the UE 106 can be mobile, have limited mobility and/or be stationary.

According to an embodiment, the access point 102 can include a selection component 108 that identifies and/or assigns a control plane device 104 for a UE 106, for example, based on various parameters and/or characteristics associated with the UE 106, data session, and/or service. For example, the selection component 108 can select an appropriate control plane device 104 based on the type of device (e.g., M2M device, non-M2M device, smartphone, tablet, fitness tracker, etc.), type of service/application (e.g., video, voice, real-time, non real time, etc.), establishment cause of the data session (e.g., emergency service, non-emergency service, etc.), priority assigned to the service, etc. Additionally or alternatively, the selection component 108 can employ control plane device data 110, for example, current load, preferences, historical performance data, etc. associated with available control plane devices 104.

Typically, M2M devices can have different characteristics than regular UEs (e.g., non-M2M devices, such as smart phones, tablet computers, personal computers, etc.). For example, regular UEs are generally are always on and performing multiple applications at any given time. Thus, regular UEs need always-on connectivity with a network. However, the network connectivity and/or communication characteristics of M2M devices vary based on applications and/or industry. Generally, in one aspect, a large portion of M2M devices is not continuously on. For example, a connected-utility meter is not coupled to the network and/or communicating with the network all day; however, a connected-medical device (e.g., a magnetic resonance imaging (MRI) scanner, X-ray machine, and/or a critical medical diagnostic equipment connected to a patient) can be continuously on (e.g., frequently communicating via the network). In another aspect, the same M2M device may change its communication/connectivity characteristics at different times and/or locations. For example, connected cars can be intermittently on, depending on whether the driver is in the car or the car is parked in a lot. Accordingly, M2M devices have non-uniform and oftentimes unpredictable traffic patterns.

Further, in one example, a larger number of M2M devices can connect to the network at the same (or substantially the same) time. For example, in dense urban environments (e.g., multi-dwelling units) a large number of M2M devices can be located within a given area (as compared to regular devices). In an example scenario when power is restored after a power outage, the large number of M2M devices can be turned on at the same (or substantially the same) time and try to attach to the network, to reset to a normal mode of operation after suffering a power failure. In this example scenario, the serving control plane device may not be able to handle the instantaneous load. In another example scenario, the serving control plane device may not have sufficient capacity to handle traffic from regular UEs, for example, during a user swarm (e.g., during a concert, sporting event, political rally, parade, etc.) at a specific serving area or location. Referring back to FIG. 1, the selection component 108 can assign a dedicated control plane device to serve M2M devices (or certain a class of M2M devices based on systemic attributes, priority access, etc.). In addition, the selection component 108 can select optimal control plane devices 104 for handling traffic from regular UEs.

Conventionally, Internet Protocol (IP) addresses of the control plane devices 104 would be pre-provisioned in the access point 102 and the access point 102 would utilize a round robin scheme to select control plane device 104 for received traffic. This selection is static since the IP addresses have been pre-provisioned in access point 102. In contrast, system 100 provides a dynamic selection of control plane devices 104 based on an analysis of data associated with the UE 106 and/or service, for example, subsequent to receiving a connection request from the UE 106.

Figure 2:
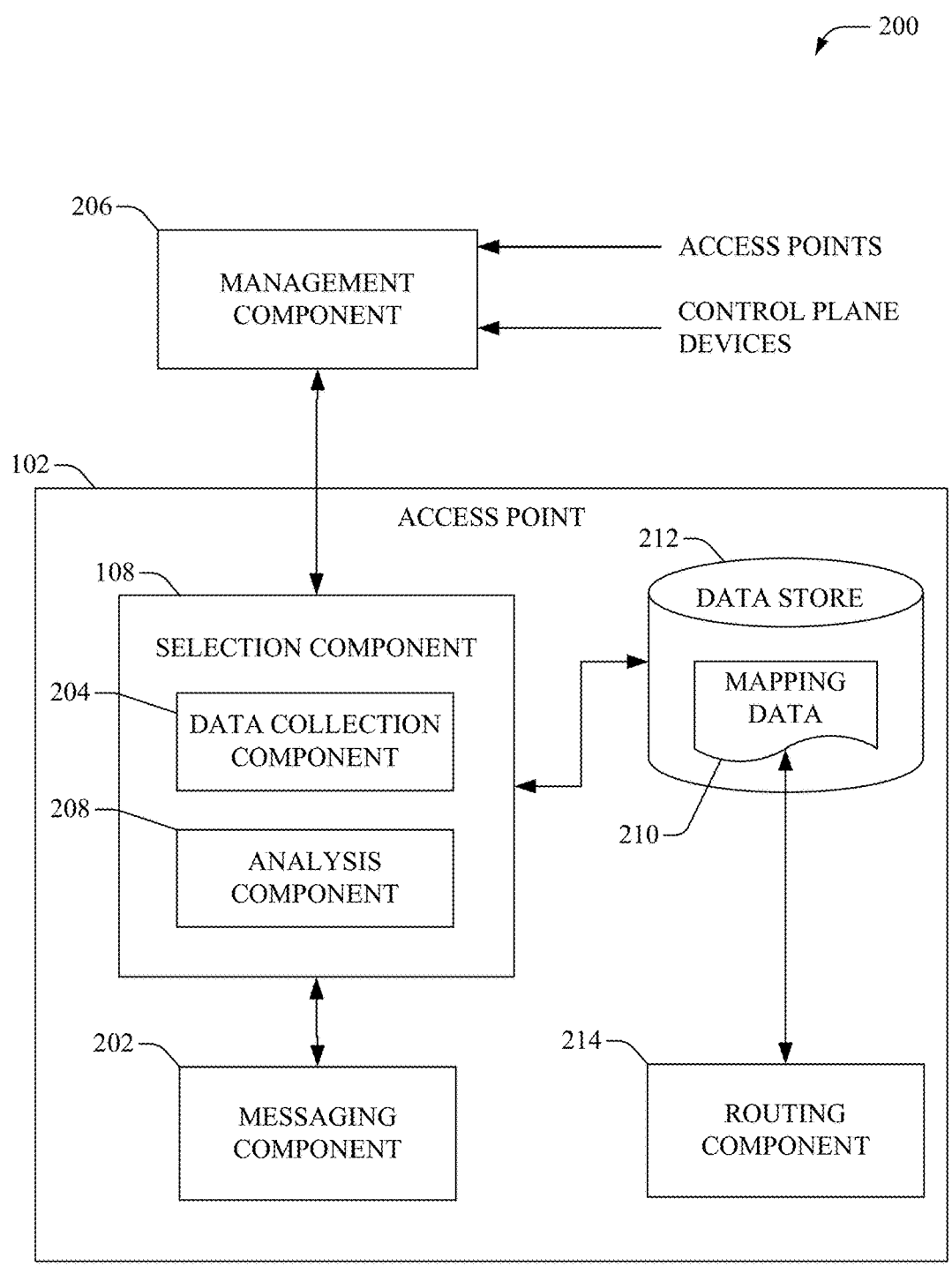
FIG. 2 illustrates an example system for dynamic upstream device selection.

Referring now to FIG. 2, there illustrated is an example system 200 for dynamic upstream device selection, in accordance with an aspect of the subject disclosure. In one aspect, the access point 102 dynamically allocates and selects the upstream control plane entities (e.g., MMEs and SGSNs) for a data session such that the control plane is established before the user plane traffic can be transferred to/from a UE (e.g., UE 106). It is noted that the access point 102 and selection component 108 can include functionality as more fully described herein, for example, as described above with regard to system 100. Further, it is noted that the term "upstream" as used herein refers to a direction in which data sent for a "stream" flowing from a network service provider device (or content provider device) to a user device. As an example, if a first device is closer to (fewer hops away from) the network service provider device (or content provider device) than a second device, then the first device is said to be upstream from the second device or conversely, the second device is downstream from the first device.

The access point 102 includes a messaging component 202 that can receive attachment data from one or more UEs (e.g., UE 106) that request access to connect to the access point 102. In one example, the messaging component 202 can facilitate a radio resource control (RRC) connection establishment procedure that configures radio bearers between the access point 102 and a UE. Typically, the RRC connection establishment comprises a RRC Connection Request message, a RRC Connection Setup message and a RRC Connection Setup complete message. In one aspect, a data collection component 204 can extract information from the RRC Connection Request, sent from the UE to the access point 102. As an example, the information can include, but is not limited to, UE identity, connection establishment cause (e.g., emergency service or non-emergency service), type of UE (e.g., M2M device or non-M2M device), UE category (e.g., associated with a combined uplink and downlink capability of the UE), service type (e.g., low priority data application, voice traffic, video traffic, mission critical application, etc.), and the like.

Additionally or alternatively, the data collection component 204 can receive network-related information from a management component 206 (e.g., periodically, in response to an event, at a specified time, etc.). The management component 206 can be partially or completely deployed within a core network and/or radio access network (RAN). As an example, the network-related information can include, but is not limited to, current (and/or predicted) load and/or traffic utilization of the control plane devices, control plane device pool dynamics, identities and/or address data (e.g., IP addresses) of control plane devices that are designated (e.g., by other access points) for handling specific services (e.g., M2M traffic), etc. Further, the data collection component 204 can determine (e.g., measure and/or receive from the management component 206) round trip time (RTT) for messages sent between the access point 102 and the control plane devices. In one aspect, management component 206 can continuously (or frequently) and/or proactively map RAN and MME network elements and transfer the updated data to the access point 102. Thus, the access point 102 can constantly (or frequently) evaluate its peer nodes health and utilization to ensure smart and efficient signaling routing to the optimal control plane devices in the network.

According to an embodiment, an analysis component 208 can analyze the information collected by the data collection component 204 to generate mapping data 210 that represents a correlation mapping of the control plane devices with UEs that are to be served based on the different UE and control plane devices characteristics. In addition, the analysis component can select one or more control plane devices for serving specific UEs and/or services. In one aspect, the mapping data 210 can be stored in a data store 212. Although depicted as completely residing within the access point 102, it is noted that the data store 212 may be locally or remotely coupled to the access point 102 and/or may be distributed across multiple network devices (not shown). As an example, the mapping data 210 can be updated periodically (or at a specified time) based on the RRC request data (e.g., determined by the data collection component 204).

In an aspect, a routing component 214 can be utilized to facilitate establishment of end-to-end control plane for a data session. Moreover, the routing component 214 can route control plane data received from UEs to corresponding control plane devices based on the mapping data 210. For example, if determined that the UE is a M2M device, the control plane data received from the UE can be routed to a control plane device dedicated to serve M2M traffic. Accordingly, the M2M traffic does not disrupt other MMEs, for example, that are managing mission critical or business critical type traffic (e.g., associated with smartphones, tablet computers, etc.) that are typically high paying revenue models for a network operator. Moreover, by managing a control plane device pool to be able to handle M2M traffic and non-M2M traffic in a segregated manner, improved scaling can be achieved for individual configurations. As volume increases, the access point 102 can control M2M traffic based on characteristics that are supported by the control plane device that has been dedicated for M2M traffic and similarly control other traffic based on characteristics of the other control plane device of a regional pool. Additionally or optionally, the analysis component 208 can perform a correlation mapping of the varying number of devices that are to be served by the access point 102 based on the information determined by the data collection component 204. In one example, the access point 102 can reject low priority devices with an extended backoff based on internal attributes to maintain a safety net for operation.

System 200 avoids pre-provisioning of the access point 102 with static mapping information for control plane devices and instead, provides a flexible and scalable design. It is noted that the data store 212 can include volatile memory(s) or nonvolatile memory(s), or can include both volatile and nonvolatile memory(s). Examples of suitable types of volatile and non-volatile memory are described below with reference to FIG. 10. The memory (e.g., data stores, databases) of the subject systems and methods is intended to comprise, without being limited to, these and any other suitable types of memory.

Figure 3:
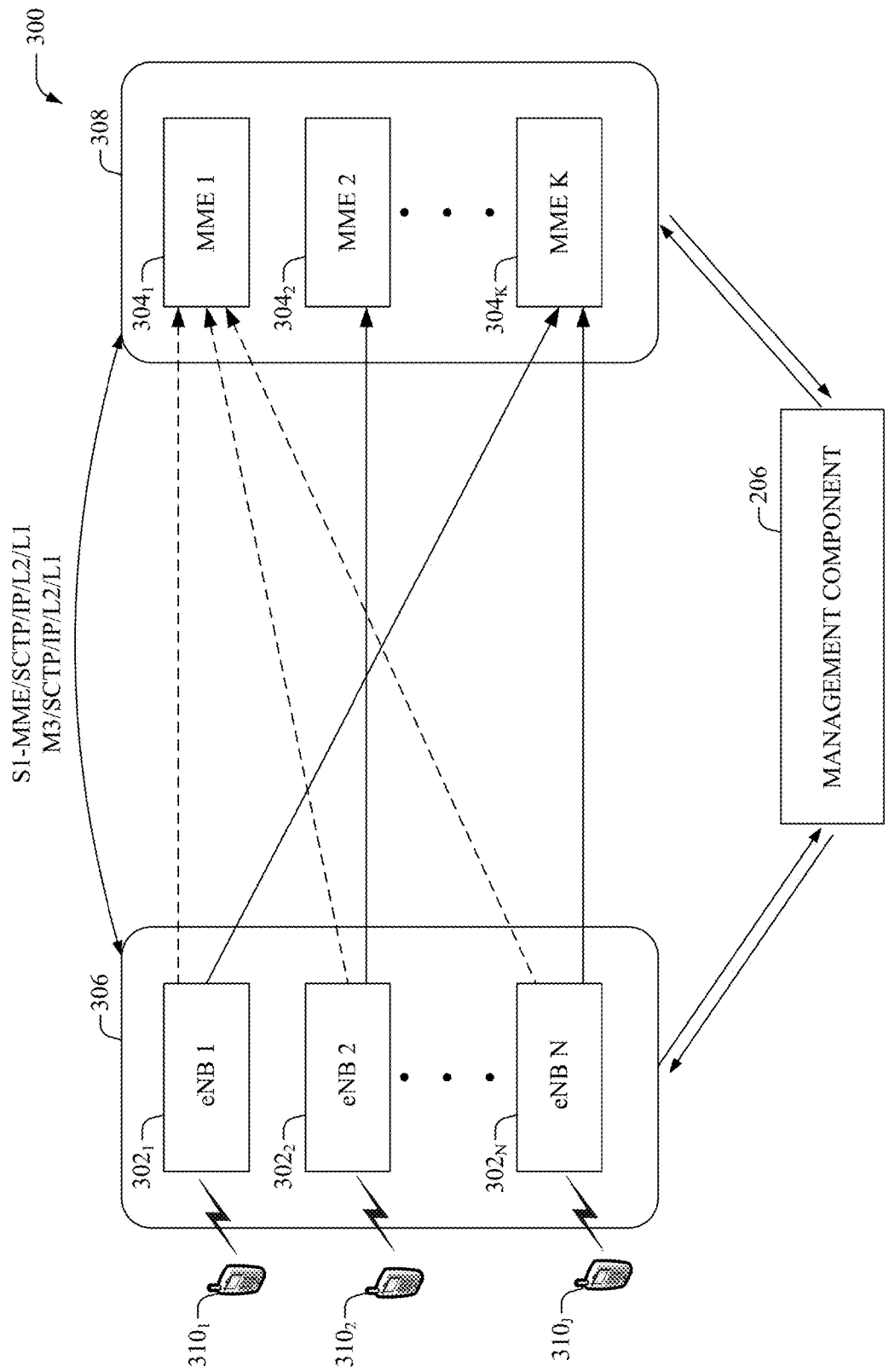
FIG. 3 illustrates an example system for assigning one or more control plane devices for handling machine-to-machine (M2M) traffic.

FIG. 3 there illustrated is an example system 300 for assigning one or more control plane devices for handling M2M traffic, in accordance with an aspect of the subject disclosure. System 300 depicts access points, eNodeBs (eNBs) $302_1$-$302_N$ (where N is most any natural number greater than 1), and control plane devices, MMEs $304_1$-$304_K$ (where K is most any natural number greater than 1), in a single pool (306, 308) configuration. In one aspect, the eNBs $302_1$-$302_N$ dynamically allocate and select the upstream control plane entities, MMEs $304_1$-$304_K$, for data sessions associated with respective UEs $310_1$-$310_J$ (where J is most any natural number) such that the control plane is established before the user plane data can be transferred to/from the UEs $310_1$-$310_J$. It is noted that the eNBs $302_1$-$302_N$ can be substantially similar to access point 102 and can include functionality as more fully described herein, for example, as described above with regard to access point 102; MMEs $304_1$-$304_K$ can be substantially similar to control plane devices 104 and can include functionality as more fully described herein, for example, as described above with regard to control plane devices 104; and UEs $310_1$-$310_J$ can be substantially similar to UE 106 and can include functionality as more fully described herein, for example, as described above with regard to UE 106.

In this example system 300, the set of access points, eNBs $302_1$-$302_N$, deployed within a regional pool 306 is served by MMEs $304_1$-$304_K$, deployed within a regional pool 308, which can be distributed across one or more data center locations. Typically, the MMEs $304_1$-$304_K$ manage the signaling related to mobility and security (authentication and authorization) for eNB $302_1$-$302_N$ access. MMEs $304_1$-$304_K$ can also manage tracking and paging procedures of the LTE UEs in idle-mode. As an example, MMEs $304_1$-$304_K$ can include at least a portion of functionality defined by 3GPP standards that are hereby incorporated by reference herein.

The eNBs $302_1$-$302_N$, served by such a regional pool 308 of MMEs $304_1$-$304_K$, can configure the S1-MME and M3 IP addresses of each MME $304_1$-$304_K$ within the pool 308 leading to complex configuration and IP address management. As the number of MMEs in the pool 308 grows, the overall configuration complexity increases. However, a large pool provides advantages, such as, but not limited to, capacity scaling, reliability and/or robust network operating conditions in case of a nodal failover within the pool 308. In such a regional pool design that consist of several MMEs across two (or more) data center locations, the eNBs $302_1$-$302_N$ can select a set of the MMEs $304_1$-$304_K$ within each location to handle special types of traffic such as, but not limited to, M2M/IoT traffic. In example system 300, MME 1 ($304_1$) has been selected to handle M2M/IoT traffic (depicted by dashed lines); whereas, the MMEs $304_2$-$304_K$ can handle non-M2M/IoT traffic (depicted by solid lines). The number of MMEs to be dedicated to serve M2M/IoT traffic in a given data center within the regional pool can vary according to operator specific design and/or deployment criteria. In one example, the selected MMEs (e.g., MME $304_1$) can have a dedicated group or pool identifier (ID) so that they can be targeted for handling M2M/IoT traffic and are not the primary designated resources for other mobility services.

Since the RAN markets serve a variety of mobility traffic, all eNBs $302_1$-$302_N$ can be configured with the S1-MME and M3 IP addresses of the MMEs $304_1$-$304_K$ in that regional pool. However, for M2M/IoT traffic handling, although the S1/M3 links exist by virtue of transport network layer connectivity at an eNB (e.g., eNBs $302_1$-$302_N$), the eNB (e.g., eNBs $302_1$-$302_N$) serving an M2M UE (e.g., UEs $310_1$-$310_J$) can intelligently route the S1/M3 application layer traffic to an appropriate MME, MME 1 ($304_1$) based on a derived internal mapping criteria (e.g., mapping data 210), rather than employing a blind-fold round robin approach.

According to an aspect, the M2M UE (e.g., UEs $310_1$-$310_J$) can transmit a RRC Connection Request with its serving eNB (e.g., eNBs $302_1$-$302_N$) and complete the RRC Connection setup process before the Non-access Stratum (NAS) layer communication can be performed with an MME (e.g., MME $304_1$). In one example, an initial NAS layer message can piggyback on (e.g., be aggregated within or be appended to) the RRC Connection Setup Complete message so that the eNB (e.g., eNBs $302_1$-$302_N$) can forward it to the MME (e.g., MME $304_1$). Alternatively, the NAS layer message can be sent independently from the M2M UE (e.g., UEs $310_1$-$310_J$) to its serving eNB (e.g., eNBs $302_1$-$302_N$). When the M2M UE (e.g., UEs $310_1$-$310_J$) has successfully established the RRC connection with its serving eNB (e.g., eNBs $302_1$-$302_N$), the serving eNB (e.g., eNBs $302_1$-$302_N$) can extract (e.g., by employing the data collection component 204) information, such as, but not limited to, the UE identity, the RRC establishment cause attributes, etc. and correlate (e.g., by employing the analysis component 208) that information with the MME mapping (e.g., mapping data 210) that it derived based on the S1/M3 link establishments and/or learning from the management component 206. It is noted that the management component 206 can synchronize with the eNBs $302_1$-$302_N$ and MMEs $304_1$-$304_K$ to determine the latest updated mapping information.

The serving eNB (e.g., eNBs $302_1$-$302_N$) can determine the UE type to MME mapping and can then exchange the S1/M3 application layer messages with the selected MME to continue with the session and connection establishment process. For example, if determined that the UE is an M2M UE, the serving eNB (e.g., eNBs $302_1$-$302_N$) can exchange the S1/M3 application layer messages with MME 1 ($304_1$). Accordingly, system 300 significantly simplifies the overall control plane session and connection establishment process and avoids the complex NAS re-routing functionality conventionally performed by eNBs that route from the application layer messages from an eNB to an MME, back from the MME to the eNB, and then again from the eNB to a target MME. Moreover, by avoiding the complex NAS-layer rerouting procedures defined in the 3GPP standards, system 300 provides an improved utilization of the core network MME pooled resources to handle a variety of mobility traffic as well as obtain the best control plane behavior for M2M service performance. In addition, the optional UE subscription learning process that is performed between conventional MMEs and Home subscriber server (HSS) as proposed in the 3GPP standards is avoided, further reducing signaling overhead and complexity. Moreover, the upfront control plane establishment process between the eNB (e.g., eNBs $302_1$-$302_N$) and selected MME 1 ($304_1$), disclosed herein, achieves optimal node selection and routing to simplify the overall session as well as connection establishment time.

It is noted that although FIG. 3 depicts only one MME (MME 1 $304_1$) selected for M2M traffic, adequate MME redundancy could be built into the geo-redundant data center MME pool design so that nodal and site level failures during extraneous situations are taken care of to provide service continuity. Further, in the absence of availability of a dedicated MME (MME 1 $304_1$), the M2M traffic and/or devices can fall back to other MME resources (e.g., MMEs $304_2$-$304_K$) subject to their availability. Further, although system 300 is described with respect to a LTE network, it is appreciated that the subject disclosure is not limited to LTE networks and can be utilized in most any communication network. For example, in virtualized environments with cloud RANs and/or cloud MMEs (e.g., wherein eNBs $302_1$-$302_N$ and/or MMEs $304_1$-$304_K$ are virtual devices/functions), the cloud RANs can allocate and/or select resources of the cloud are dedicated and/or reserved to handle M2M traffic.

In one aspect, a limited licensing model can be utilized for the selected MME 1 $304_1$, wherein only a portion of the capacity of the MME 1 $304_1$, e.g., that is determined based on current and/or projected M2M traffic patterns, can be licensed. As traffic patterns change, the model can be modified to increase the licensed capacity of the MME 1 $304_1$, such that the MME 1 $304_1$ can handle more M2M traffic.

Figure 4:
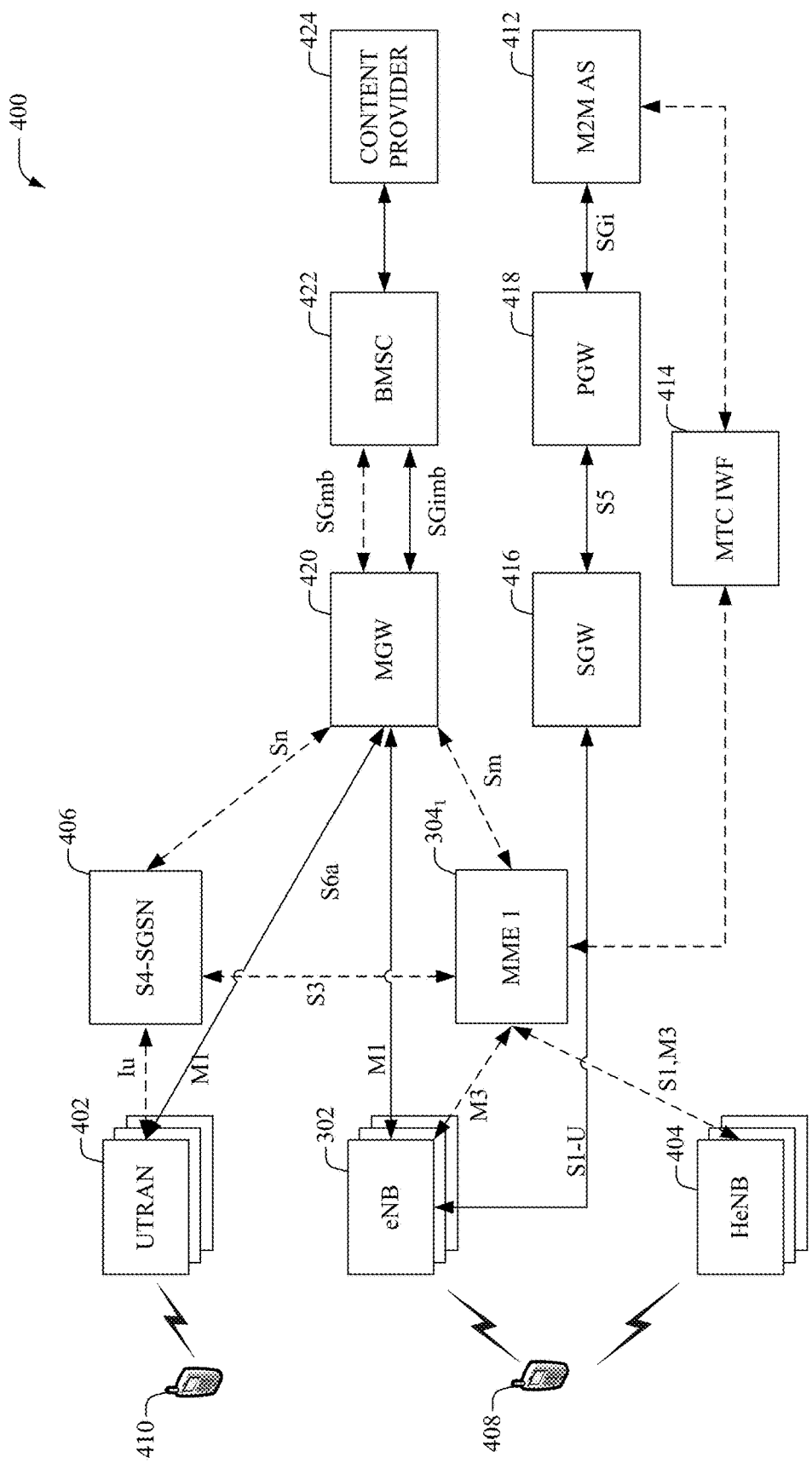
FIG. 4 illustrates example Long Term Evolution (LTE)/Third Generation (3G) broadcast network architecture for efficiently establishing control plane session and connection for M2M traffic.

Referring now to FIG. 4, there illustrated is LTE/3G broadcast network architecture 400 for efficiently establishing control plane session and connection for M2M traffic, according to an aspect of the subject disclosure. According to an aspect, a dedicated MME, MME 304, can be utilized to handle M2M traffic. Such a dedicated MME configuration can be used in a pooled resource design to target not only regular unicast M2M traffic originations/terminations but also for broadcast M2M traffic. It is noted that the eNB 302 can be substantially similar to eNBs $302_1$-$302_N$ and can include functionality as more fully described herein, for example, as described above with regard to eNBs $302_1$-$302_N$, and MME $304_1$ can include functionality as more fully described herein, for example, as described above with regard to system 300.

In an aspect, access point devices such as, eNB 302, NodeBs of Universal Terrestrial Radio Access Network (UTRAN) 402, Home eNB (HeNB) 404 (e.g., femtocell access points, pico stations, small cell access points, etc.) can select corresponding control plane devices such as, MME 1 $304_1$ and S4-SGSN 406 respectively for handling specific traffic (e.g., M2M traffic). Moreover, on determining that user equipment (e.g., LTE UE 408 and/or 3G UE 410) are M2M devices, the access point devices can communicate with the selected control plane devices to facilitate end-to-end control plane session and connection establishment. As an example, the control plane can be established with an M2M application server (AS) 412, via a Machine Type Communication Interworking Function (MTC IWF) 414. Once the end-to-end control plane session has been established, user plane data can be communicated between the user equipment (e.g., LTE UE 408 and/or 3G UE 410) and the M2M AS 412. As an example, the M2M AS 412 can be coupled to the eNB 302 via serving gateway (SGW) 416 and Packet Data Network Gateway (PGW) 418.

During point-to-multipoint broadcast technology, for example, Multimedia Broadcast Multicast Service (MBMS) (or evolved MBMS (eMBMS)), broadcast core network nodes such as the MBMS gateway (MGW) 420 can determine the dedicated M2M MME, MME 1 $304_1$, based on data received via an Sm interface. In an aspect, the MGW 420 can employ the MME 1 $304_1$ to communicate any M2M service specific broadcast related control plane exchange messages received from a Broadcast Multicast Service Controller (BMSC) 422 that manages broadcast of multimedia content from a content provider 424. As an example, the content provider 424 can include public land mobile network (PLMN)-internal providers and/or external content providers (e.g., coupled via an external packet data network, such as, the Internet). Multimedia content can include streaming services, live (or near-live) mobile TV, on-demand video, radio broadcasting, file downloads, subscription notifications, advertisements/promotions, software updates, and/or emergency alerts.

According to an embodiment, the BMSC 422 can perform authentication, content authorization, billing and/or configuration of the data flow through the cellular network and can act as a proxy content server. Moreover, BMSC 422 can provide at least the following functions: (i) managing authorizations and generating charging records (Membership function); (ii) Scheduling of eMBMS sessions and transmissions (Session and Transmission function); (iii) Operating as a proxy agent for signaling between Gateway GPRS Support Nodes (GGSNs) and other BMSC sub-functions, transparent to the GGSNs; (iv) generating charging records for content provider charging of transmitted data (Proxy and Transport function); (v) providing service announcements for multicast and broadcast user services (Service Announcement function); and (vi) managing security functionality for MBMS (Security function).

The BMSC 422 can communicate with the MGW 420 to establish a control plane and once established, transfer the content to the MGW 420 over the user-plane. Typically, the BMSC 422 can initiate eMBMS session procedures for end-to-end control plane message exchanges between the BMSC 422 and access points (eNB 302, UTRAN 402, HeNB 404). In one aspect, to establish these eMBMS session procedures, a BMSC 422 can be manually pre-provisioned with information (e.g., identification/addressing data) for all its downstream control devices (e.g., MGWs, MMEs, and/or SGSNs). Alternatively, in another aspect, the BMSC 422 can have a simplified design that simply initiates session exchange procedural triggers and the MGW 420 intelligently and dynamically selects downstream control plane devices, such as the MME 1 $304_1$, based on an analysis of various parameters (e.g., domain name server (DNS) records, round trip time (RTT), load information, active/inactive link status, type of content, etc.). Moreover, if determined that content is to be broadcast to M2M devices (e.g., LTE UE 408 and/or 3G UE 410), the BMSC 422 and/or MGW 420 can select control plane devices (e.g., MME 1 $304_1$, and/or S4-SGSN 406) that have been assigned/reserved to handle only M2M traffic.

Once the control plane has been established, the MGW 420 can route the multimedia content received from the BMSC 422 to all access points (e.g., eNB 302, UTRAN 402, HeNB 404) participating in the broadcast, for example, by employing IP multicast for downlink packet delivery. In one example, the access points can utilize single-frequency network (SFN) technology to broadcast the content into specified service areas, such that all contributing access points broadcast the same content during the same radio time slots. UEs (e.g., LTE UE 408 and/or 3G UE 410) can select subscribed broadcast streams within the SFN and receive relevant multimedia content. Although, the systems and methods disclosed herein are described with reference to a LTE network, it is noted that the subject specification is not so limited and can be implemented/utilized in various communication networks that perform multimedia content broadcast. Further, it is noted that different signaling interfaces can be utilized for different communication networks and the subject specification is not limited to utilization of the interfaces illustrated in FIG. 4.

Figure 5:
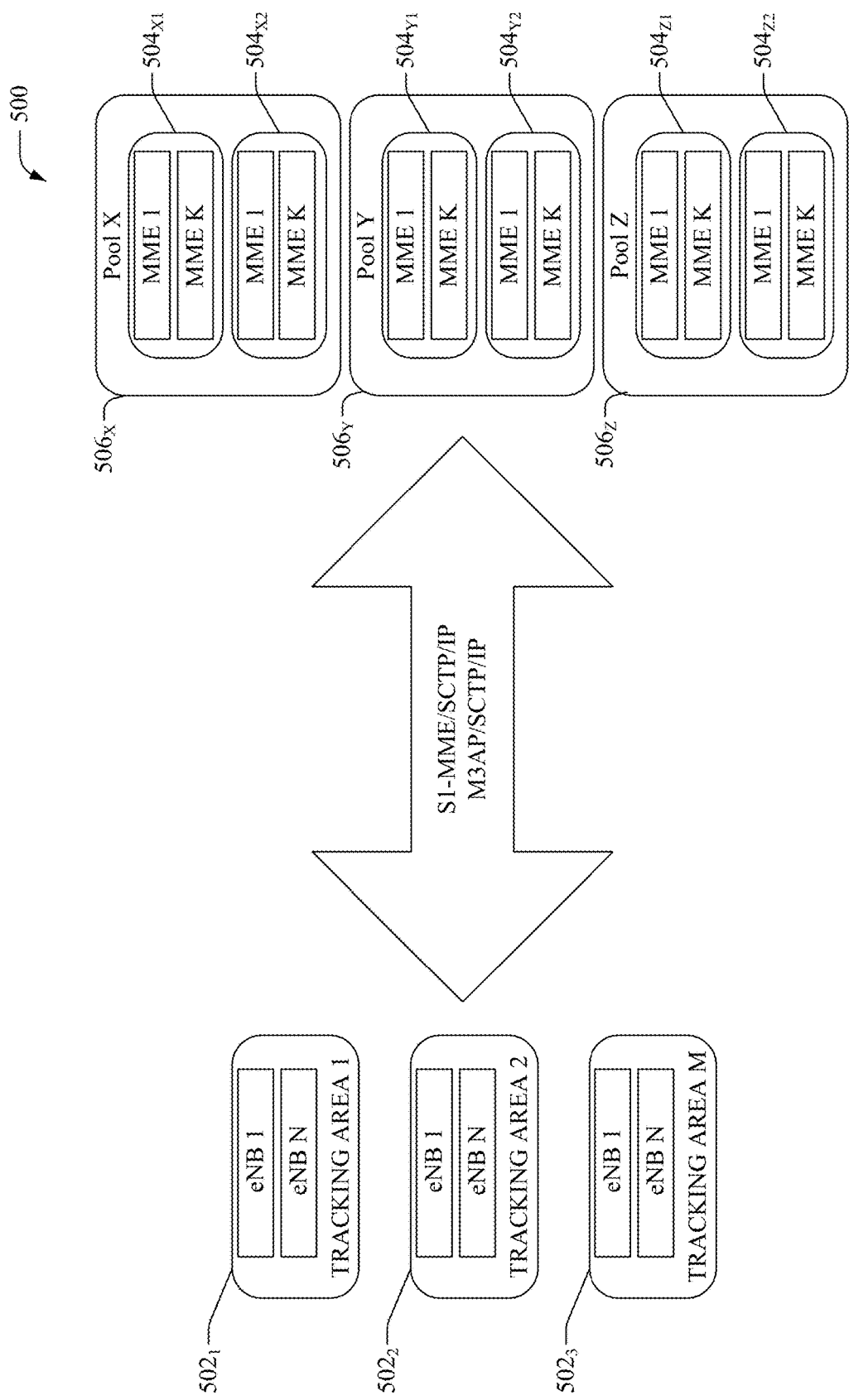
FIG. 5 illustrates an example system that depicts an example mapping of eNodeBs (eNBs) with their serving Mobility Management Entities (MMEs).

FIG. 5 illustrates an example system 500 that depicts an example mapping of eNBs with their serving MMEs, according to aspects of the disclosed subject matter. In LTE/LTE-A networks, the eNB employs S1-MME/M3 Stream Control Transmission Protocol (SCTP) based interfaces to setup the S1/M3 links prior to exchanging the S1AP and M3AP application layer protocol messages with its serving MME. The eNB can be supported by a standalone MME in a 1:1 paired mode, in which case there is a single S1/M3 connection. Although this type of connection is simpler for transport connectivity as well as IP addressing, it has significant drawbacks in terms of capacity and scalability. Typically, in a large mobile operator environment, the eNBs deployed within different tracking areas (e.g., tracking areas $502_1$-$502_2$) can be supported by a pooled MME configuration, wherein several MMEs (e.g., MMEs $504_{x1}$-$504_{zk}$) are available to serve the eNBs.

Conventional eNBs utilized a simplistic static round robin manner to select MMEs for establishing control plane connections and each MME has S1/M3 connection towards each eNB. In pooled configurations, the eNB IP addressing configuration across S1/M3 interfaces becomes complex as the number of MMEs grow in the pool. While this arrangement is good for capacity and load sharing, it may not be ideal when a subset of this pool is targeted to carry M2M/IoT traffic. Lack of a flexible design for dedicated M2M traffic handling may lead to unforeseen network and mission critical service outage issues resulting from stormy network conditions, disaster situations, network element failover, transport backhaul failures, data center facilities issues etc. In small pools, the problem could be exacerbated if a large volume of M2M type devices is trying to attach to the network in such situations where limited MME pool resources are available and as a result, a large number of these M2M devices need to be throttled back for delayed entry to the network. In some cases, these M2M devices could be reporting emergency conditions to the network that may require prompt attention and resolution. Such a delayed core network acceptance and end service delivery may lead to poor customer satisfaction and subscriber churn.

Referring back to FIG. 5, there depicted is a pooled architecture wherein the MMEs (e.g., MMEs $504_{x1}$-$504_{zk}$) can be distributed across data centers $506_x$-$506_z$, for example, to create geo-redundancy. Pools can be designed to be uniform or non-uniform depending on operator specific deployment criteria. The MMEs (e.g., MMEs $504_{x1}$-$504_{zk}$) in the pool configuration can have unique MME codes and identical group IDs. When a set of these MMEs (MME-M) are designated for M2M/IoT traffic, they can continue to utilize the same MME code but be mapped with a dedicated group ID to indicate that they handle only M2M traffic (and/or are prohibited from handling non-M2M traffic), resulting in efficient pool partitioning. Accurate mapping of such upstream MME nodes is utilized by the eNB to intelligently select the targeted MME-M. In one aspect, an eNB within a tracking area (e.g., tracking area $502_1$-$502_2$) can determine a device type (e.g., M2M device or non-M2M device) of a device that is attempting to connect (or has connected to) the eNB and determine the MME mapping (e.g., mapping of the eNB to a MME that is designated as an MME-M for handling only M2M traffic) during its S1/M3 setup. Additionally or alternately, the eNB s can receive information via a trigger-based polling from a network management system (e.g., management component 206). Such a pre-defined eNB to MME-M mapping, dynamic learning with changes in the core network and targeted S1/M3 message exchange mechanism with the list of right MME-M control nodes in the core network based on M2M device type and/or priority can result in optimal MME node selection customized to handle M2M traffic. Accordingly, complex HSS configuration for the M2M devices, NAS layer re-routing, and/or additional S1/M3 signaling to select the right MME-M can be avoided by the dynamic MME selection by the eNBs of system 500.

Although only three tracking areas $502_1$-$502_2$ and three regional pools X-Z are depicted, it can be appreciated that the subject disclosure is not limited to three tracking areas and/or pools and can be implemented with one or more datacenters deployed within a greater or fewer number of tracking areas and/or regional pools. It can be noted that the eNBs deployed within the tracking areas $502_1$-$502_2$ can be substantially similar to eNBs $302_1$-$302_N$ and can include functionality as more fully described herein, for example, as described above with regard to eNBs $302_1$-$302_N$. Further, the MMEs deployed within the data centers $504_{x1}$-$504_{z2}$ can be substantially similar to MMEs $302_1$-$302_K$ and include functionality as more fully described herein, for example, as described above with regard to MMEs $302_1$-$302_K$.

Figure 6:
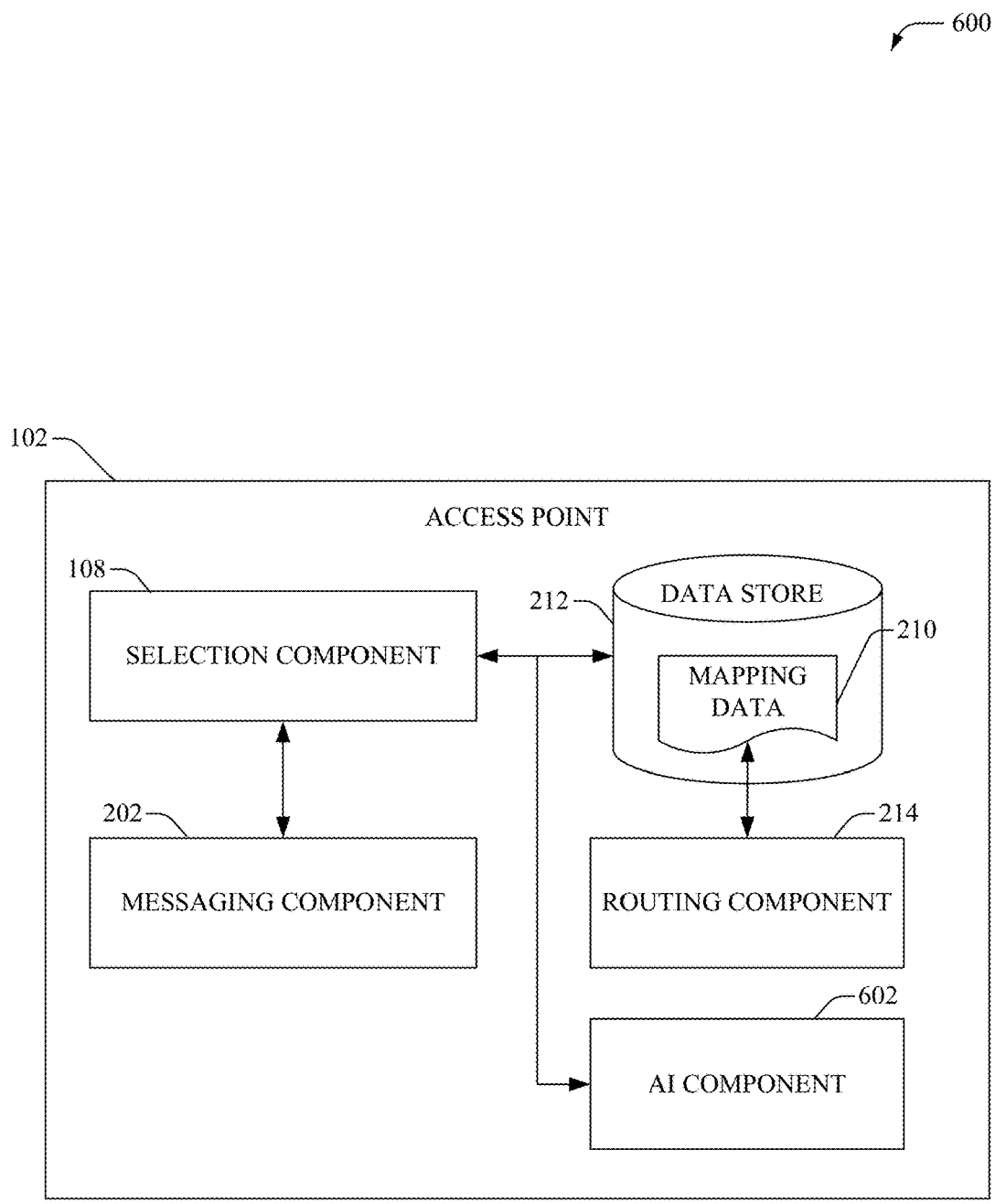
FIG. 6 illustrates an example system that facilitates automating one or more features in accordance with the subject embodiments.

Referring now to FIG. 6, there illustrated is an example system 600 that employs an artificial intelligence (AI) component (602) to facilitate automating one or more features in accordance with the subject embodiments. It can be noted that the access point 102, messaging component 202, selection component 108, mapping data 210, data store 212, and routing component 214 can include functionality as more fully described herein, for example, as described above with regard to systems 100-200.

In an example embodiment, system 600 (e.g., in connection with automatically selecting upstream control plane devices) can employ various AI-based schemes (e.g., intelligent processing/analysis, machine learning, etc.) for carrying out various aspects thereof. For example, a process for determining which devices to select and/or optimal SGSNs or MMEs for a target service or customized for specific type of UE, service, and/or data session etc. can be facilitated via an automatic classifier system implemented by AI component 602. Moreover, the AI component 602 can various exploit artificial intelligence (AI) methods or machine learning methods. Artificial intelligence techniques can typically apply advanced mathematical algorithms—e.g., decision trees, neural networks, regression analysis, principal component analysis (PCA) for feature and pattern extraction, cluster analysis, genetic algorithm, or reinforced learning—to a data set. In particular, AI component 602 can employ one of numerous methodologies for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

As will be readily appreciated from the subject specification, an example embodiment can employ classifiers that are explicitly trained (e.g., via a generic training data) as well as implicitly trained (e.g., via observing device/operator preferences, historical information, receiving extrinsic information, type of service, type of device, etc.). For example, SVMs can be configured via a learning or training phase within a classifier constructor and feature selection module. Thus, the classifier(s) of AI component 602 can be used to automatically learn and perform a number of functions, including but not limited to determining according to a predetermined criteria, selection of SGSNs and/or MMEs for control plane establishment. The criteria can include, but is not limited to, historical patterns and/or trends, service provider preferences and/or policies, predicted performance data of the control plane devices, predicted load information of the control plane devices, event data, latency data, reliability/availability data, current time/date, and the like.

According to an embodiment, the network architecture disclosed herein provides several advantages and features such as, but not limited to, (i) providing enhanced intelligent eNB algorithms for tracking M2M devices based on their priority, device type, service type, and/or MME loading during an RRC connection setup phase; (ii) facilitating eNB's dynamic selection of MME nodes for targeted M2M traffic routing alleviates MME loading that could otherwise stem from large M2M devices; (iii) performing a simplified partitioning of regionally pooled MMEs and dedicating a subset of them for M2M traffic handling on-demand; (iv) providing a flexible network design that addresses MME-M failover and/or rerouting for session and/or connection establishment; (v) leveraging SCTP path management algorithms and/or customizing them between eNB and MME for optimization of M2M related S1-MME/M3 interface behavior; (vi) capital and/or operational cost savings as there is no need to re-invest and manage dedicated MME-M design and/or configure the MME pooled resources for M2M; (vii) providing a distributed MME-M network topology design that benefits targeted premium broadcast and/or unicast services for M2M device types; (viii) providing a robust core network design that is M2M/IoT scalable, future proof and 5G ready; etc.

Figure 7:
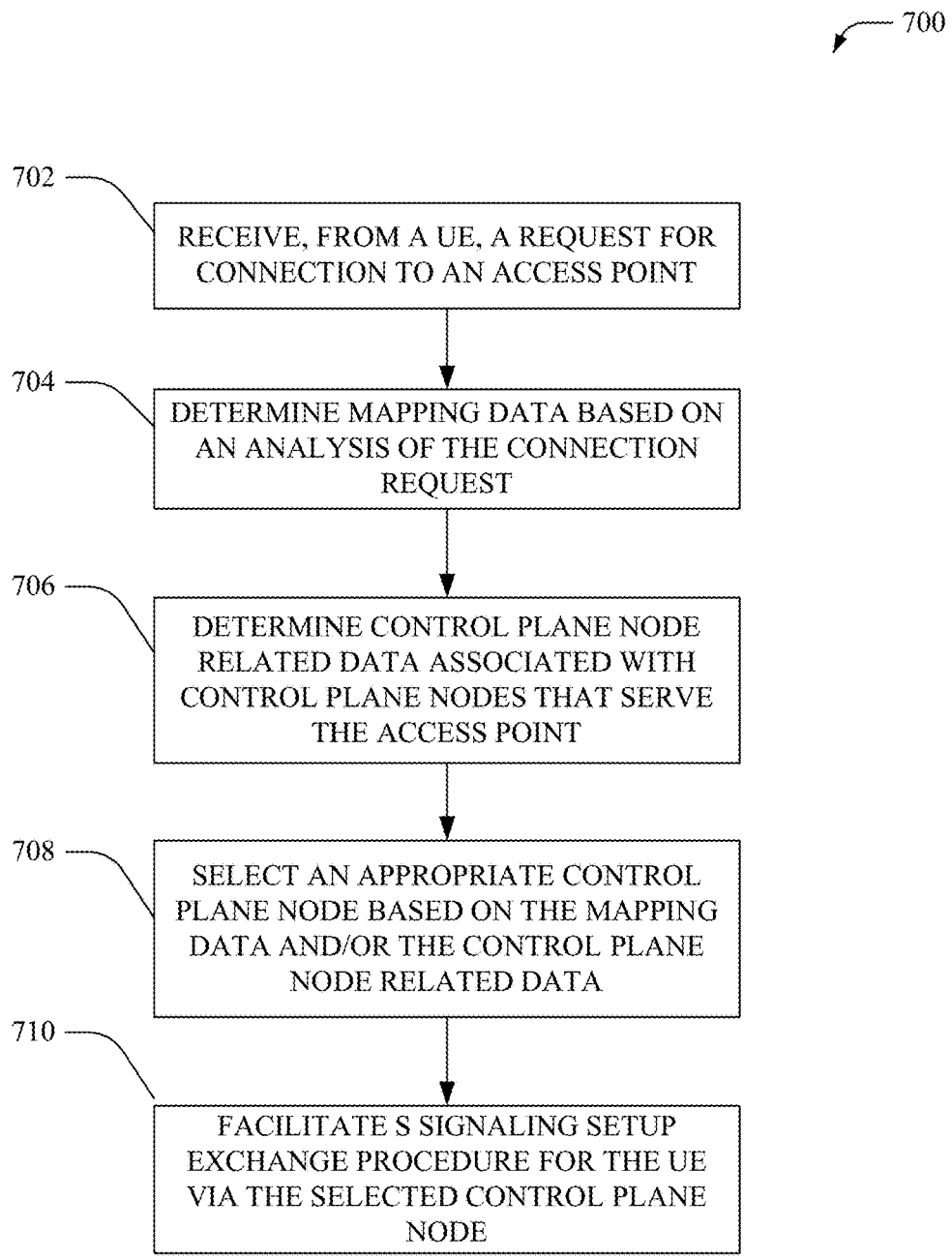
FIG. 7 illustrates an example method that facilitates efficient control node selection.
Figure 8:
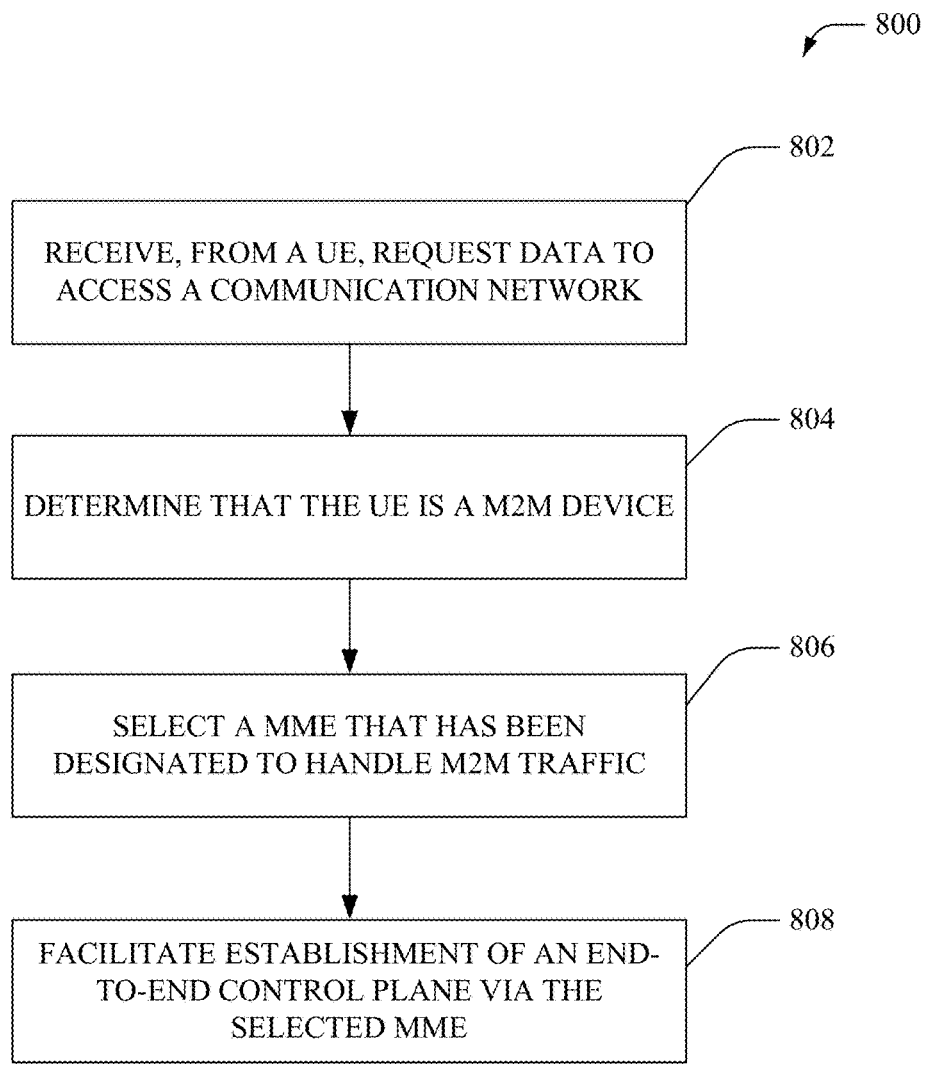
FIG. 8 illustrates an example method that facilitates efficient M2M setup in accordance with an aspect of the disclosure.

FIGS. 7-8 illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 7 there illustrated is an example method 700 that facilitates efficient control node selection, according to an aspect of the subject disclosure. In an aspect, method 700 can be implemented by one or more RAN devices (e.g., access point 102) of a communication network (e.g., cellular network). At 702, a request for connection to an access point can be received from a UE. In one aspect, the request can comprise a RRC connection request. As an example, the RRC connection request can include information such as, but is not limited to, the UE's identity, connection establishment cause (e.g., emergency service or non-emergency service), type of UE (e.g., M2M device or non-M2M device), UE category and/or classes (e.g., category 1-category 9), service type (e.g., low priority data application, voice traffic, video traffic, mission critical application, etc.), and the like. Alternatively, the information can be requested through one or more other messages exchanged between the UE and the access point. At 704, mapping data (e.g., an internal mapping table) can be determined based on an analysis of the request. At 706, control plane node related data associated with control nodes can be determined. As an example, the control plane node related data can include, but is not limited to, current (and/or predicted) load and/or traffic utilization of the control plane nodes, control plane node pool dynamics, round trip latency associated with data packets sent between the access point and the control plane node, identities and/or address data of control plane nodes that are designated (e.g., by other access points and/or other network devices) for handling specific services (e.g., M2M traffic), etc.

At 708, an appropriate control plane node can be selected based on the mapping data and/or the control plane node related data. For example, if determined that the UE is an M2M device, a control node reserved for handling M2M traffic can be selected, otherwise if the UE is a non-M2M device, an optimal control node can be selected from a control node pool. At 710, a signaling setup exchange procedure can be setup for the UE via the selected control plane node.

FIG. 8 illustrates an example method 800 that facilitates efficient M2M setup, according to an aspect of the subject disclosure. As an example, method 800 can be implemented by one or more RAN devices (e.g., access point 102) of a communication network (e.g., cellular network). At 802, request data to access a communication network can be received from a UE. As an example, the request can comprise a RRC connection request comprising information such as, but is not limited to, the UE's identity, connection establishment cause (e.g., emergency service or non-emergency service), type of UE (e.g., M2M device or non-M2M device), UE category and/or class, service type (e.g., low priority data application, voice traffic, video traffic, mission critical application, etc.), and the like. At 804, it can be determined that the UE is an M2M device, for example, based on an analysis of the request data. In one example, an eNB serving the UE can extract the information from the request data and create an internal mapping table. In addition, the eNB can receive MME pool dynamics and/or dedicated service specific MMEs along with their instantaneous traffic utilization and/or round trip latency from a coordinated network management system. In one aspect, the eNB can perform a correlation mapping of the varying number of devices it has to serve based on the above attributes (e.g., extracted and/or received data). For example, the eNB can reject low priority devices with an extended backoff based on its internal attributes to maintain a safety net for operation. Further, at 806, an MME that has been designated to handle M2M traffic can be selected, for example, based on the internal mapping and/or the received data. Furthermore, at 808, establishment of an end-to-end control plane can be facilitated via the selected MME. Moreover, the MME can complete the signaling setup exchange procedures for the UE and ensure that the UE is appropriately attached to the communication network. In one aspect, a continuous, proactive, periodic, and/or frequent mapping of RAN and MME network elements can be maintained and/or updated in the network management system so that the eNB has updated information to evaluating its peer nodes health and utilization for ensuring smart and efficient S1/M3 signaling routing to the optimal MME in the network.

Figure 9:
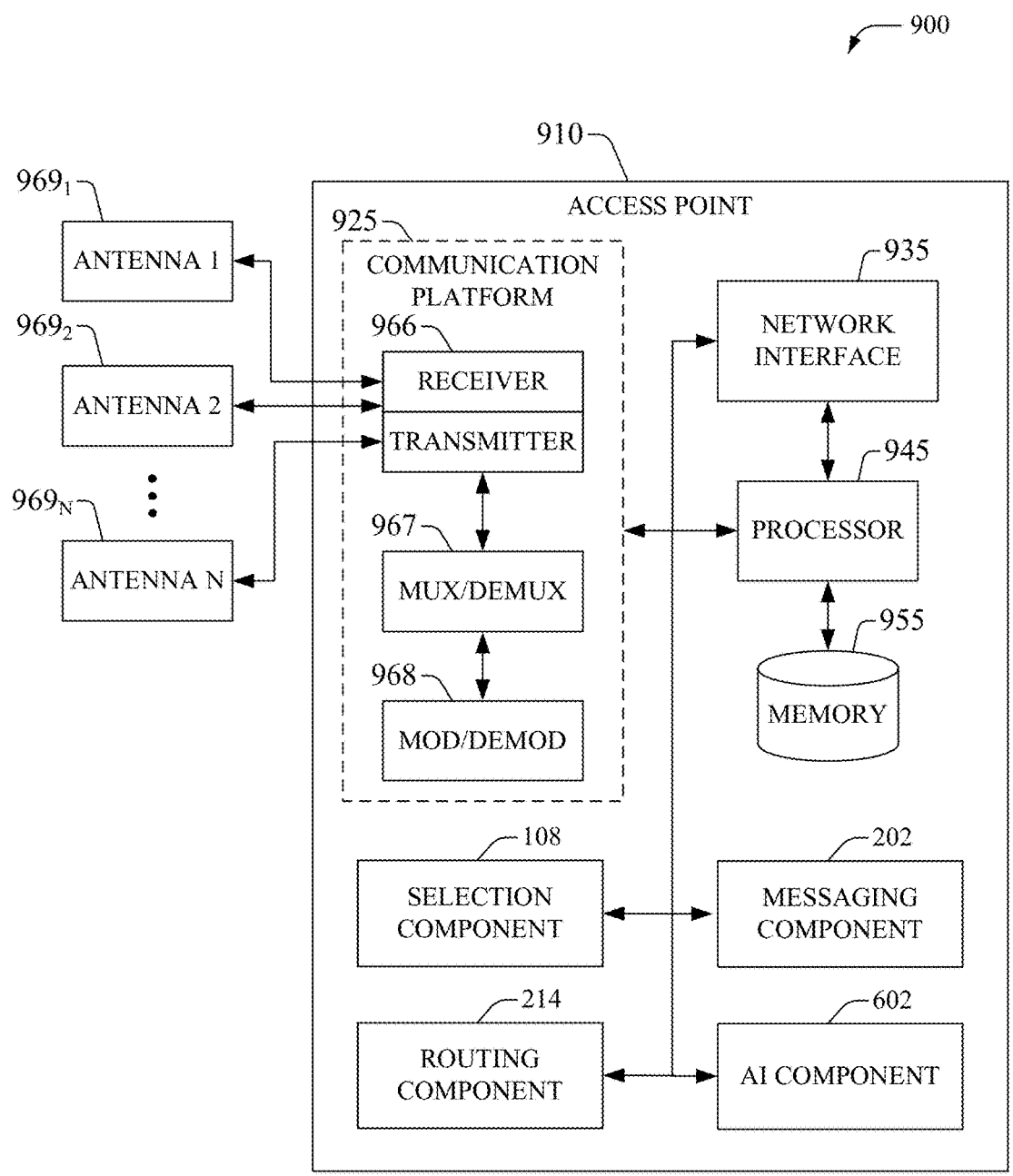
FIG. 9 illustrates an example embodiment of an access point that can facilitate targeted control node selection for a specific service.

With respect to FIG. 9, in example embodiment 900, access point 910 can receive and transmit signal(s) (e.g., traffic and control signals) from and to wireless devices, access terminals, wireless ports and routers, etc., through a set of antennas $969_1$-$969_N$. It should be appreciated that while antennas $969_1$-$969_N$ are a part of communication platform 925, which comprises electronic components and associated circuitry that provides for processing and manipulating of received signal(s) (e.g., a packet flow) and signal(s) (e.g., a broadcast control channel) to be transmitted. In an aspect, communication platform 925 includes a transmitter/receiver (e.g., a transceiver) 966 that can convert signal(s) from analog format to digital format upon reception, and from digital format to analog format upon transmission. In addition, receiver/transmitter 966 can divide a single data stream into multiple, parallel data streams, or perform the reciprocal operation. Coupled to transceiver 966 is a multiplexer/demultiplexer 967 that facilitates manipulation of signal in time and frequency space. Electronic component 967 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 967 can scramble and spread information (e.g., codes) according to substantially any code known in the art; e.g., Hadamard-Walsh codes, Baker codes, Kasami codes, polyphase codes, and so on. A modulator/demodulator 968 is also a part of operational group 925, and can modulate information according to multiple modulation techniques, such as frequency modulation, amplitude modulation (e.g., M-ary quadrature amplitude modulation (QAM), with M a positive integer), phase-shift keying (PSK), and the like.

Access point 910 also includes a processor 945 configured to confer functionality, at least partially, to substantially any electronic component in the access point 910, in accordance with aspects of the subject disclosure. In particular, processor 945 can facilitate access point 910 to implement configuration instructions received through communication platform 925, which can include storing data in memory 955. In addition, processor 945 facilitates access point 910 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 945 can manipulate antennas $969_1$-$969_N$ to facilitate beamforming or selective radiation pattern formation, which can benefit specific locations (e.g., basement, home office . . . ) covered by access point; and exploit substantially any other advantages associated with smart-antenna technology. Memory 955 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 955 can store configuration information such as schedules and policies; access point address(es) or geographical indicator(s); access lists (e.g., white lists); license(s) for utilization of add-features for access point 910, and so forth. In addition, data store 212 can comprise memory 955 that stores mapping data 210.

In embodiment 900, processor 945 is coupled to the memory 955 in order to store and retrieve information necessary to operate and/or confer functionality to communication platform 925, broadband network interface 935 (e.g., a broadband modem), and other operational components (e.g., multimode chipset(s), power supply sources . . . ; not shown) that support the access point 910. In one embodiment, the access point 910 can further include the selection component 108, the messaging component 202, the routing component 214, and/or the AI component 602, which can include functionality, as more fully described herein, for example, with regard to systems 100-600. In addition, it is to be noted that the various aspects disclosed in the subject specification can also be implemented through (i) program modules stored in a computer-readable storage medium or memory (e.g., memory 955) and executed by a processor (e.g., processor 945), or (ii) other combination(s) of hardware and software, or hardware and firmware. Access point 102, eNBs $302_1$-$302_N$, eNB 302, NodeB of the UTRAN 402, and/or HeNB 404, can be substantially similar to, and can include at least a portion of the functionality described with reference to, access point 910.

Figure 10:
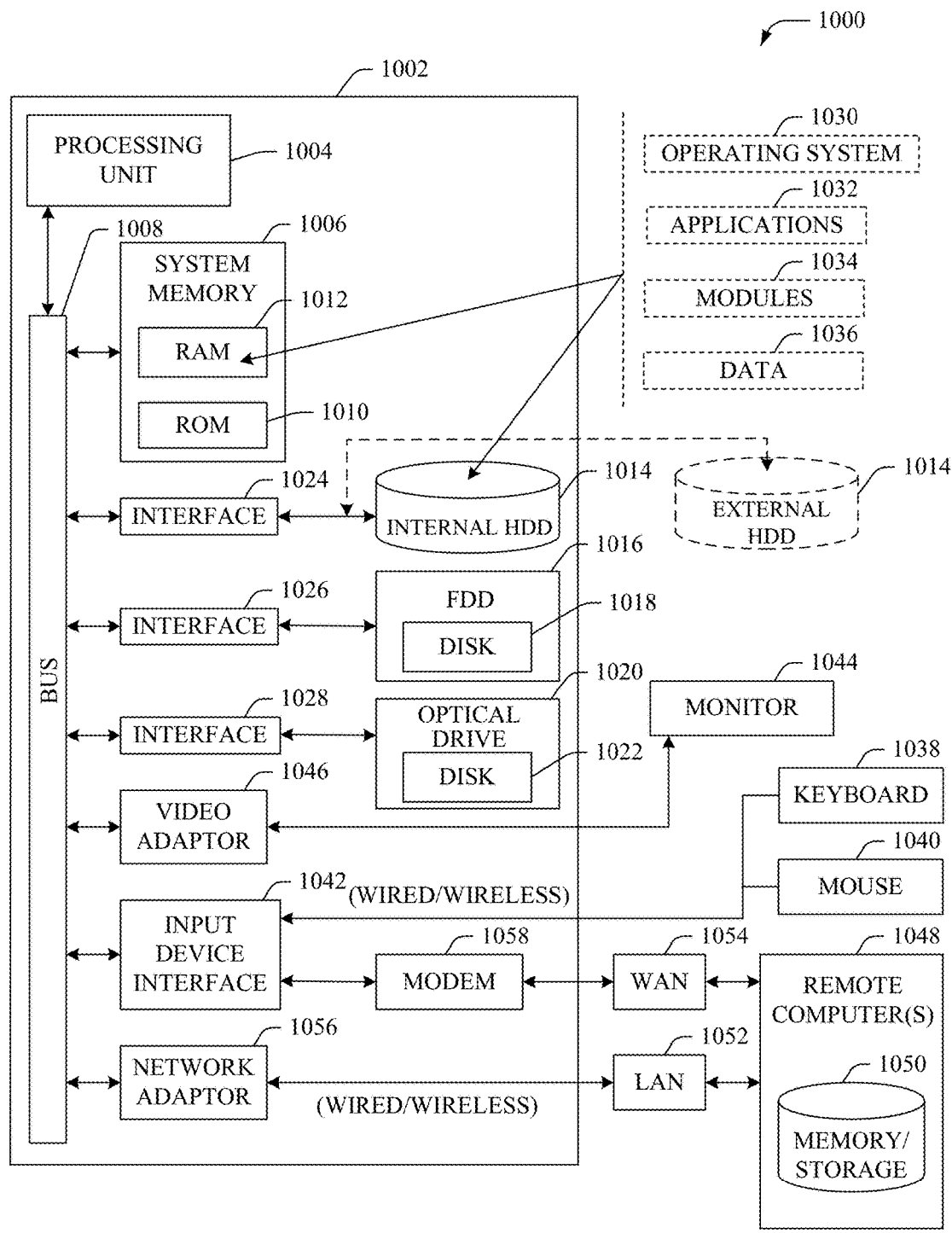
FIG. 10 illustrates a block diagram of a computer operable to execute the disclosed communication architecture.

Referring now to FIG. 10, there is illustrated a block diagram of a computer 1002 operable to execute the disclosed communication architecture. In order to provide additional context for various aspects of the disclosed subject matter, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various aspects of the specification includes a computer 1002, the computer 1002 including a processing unit 1004, a system memory 1006 and a system bus 1008. As an example, the component(s), application(s) server(s), equipment, system(s), interface(s), gateway(s), controller(s), node(s) and/or device(s) (e.g., access point 102, control plane device(s) 104, UE 106, selection component 108, messaging component 202, data collection component 204, management component 206, analysis component 208, data store 212, routing component 214, eNBs $302_1$-$302_N$, eNB 302, MMEs $304_1$-$304_K$, UEs $310_1$-$310_J$, UTRAN 402, HeNB 404, S4-SGSN 406, UE 408, UE 410, M2M AS 412, MTC IWF 414, SGW 416, PGW 418, MGW 420, BMSC 422, content provide 424, eNBs within tracking areas $502_1$-$502_3$, datacenters $504_{X1}$-$504_{X2}$, $504_{Y1}$-$504_{Y2}$, $504_{Z1}$-$504_{Z2}$, AI component 602, etc.) disclosed herein with respect to systems 100-600 can each include at least a portion of the computer 1002. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014, which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and/or a pointing device, such as a mouse 1040 or a touchscreen or touchpad (not illustrated). These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc. A monitor 1044 or other type of display device is also connected to the system bus 1008 via an interface, such as a video adapter 1046.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., desktop and/or portable computer, server, communications satellite, etc. This includes at least WiFi and Bluetooth™ wireless technologies or other communication technologies. Thus, the communication can be a predefined structure as with a conventional network or simply an ad hoc communication between at least two devices.

WiFi, or Wireless Fidelity networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
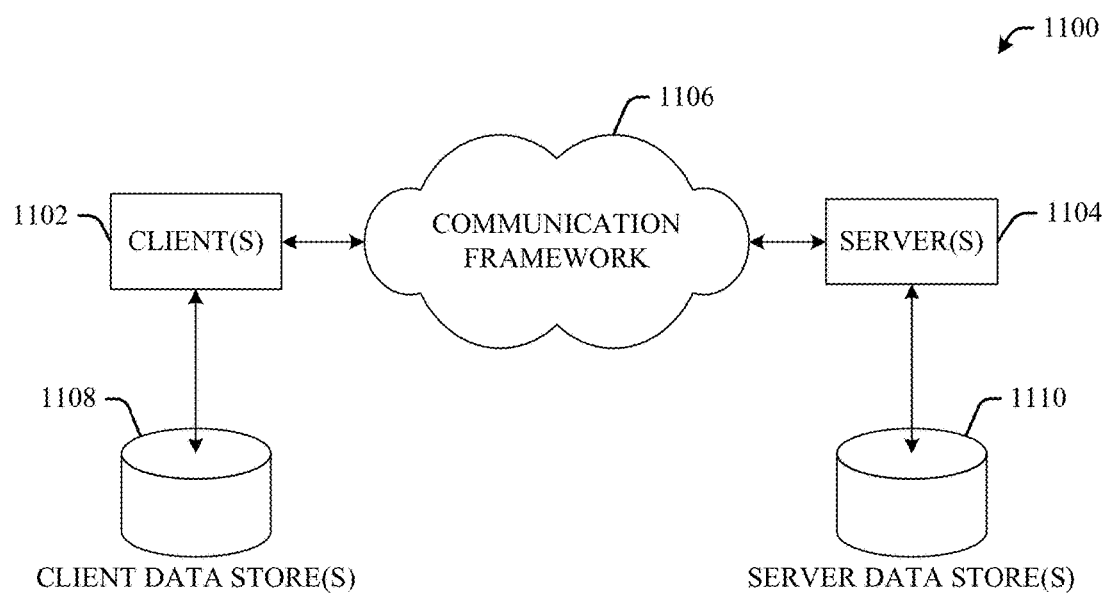
FIG. 11 illustrates a schematic block diagram of a computing environment in accordance with the subject specification

Referring now to FIG. 11, there is illustrated a schematic block diagram of a computing environment 1100 in accordance with the subject specification. The system 1100 includes one or more client(s) 1102. The client(s) 1102 can be hardware and/or software (e.g., threads, processes, computing devices).

The system 1100 also includes one or more server(s) 1104. The server(s) 1104 can also be hardware and/or software (e.g., threads, processes, computing devices). The servers 1104 can house threads to perform transformations by employing the specification, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet, cellular network, etc.) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An access point device, comprising:
   a processor; and
   a memory that stores executable instructions that, when executed by the processor, facilitate performance of operations, comprising:
      receiving, from a network management device of a communication network, identifier data indicative of respective group identifiers assigned to control plane devices that serve the access point device, wherein a group identifier of the respective group identifiers specifies a category of traffic handled by a group of the control plane devices, and wherein the identifier data is determined based on a result of polling the control plane devices; and
      based on the identifier data and service data associated with a service related to a user equipment that is to be served by the access point device, selecting a control plane device of the control plane devices to facilitate control plane establishment for the service.

2. The access point device of claim 1, wherein the service data comprises classification data indicative of a type of the service.

3. The access point device of claim 2, wherein the type of the service comprises the type of an emergency service.

4. The access point device of claim 1, wherein the service data comprises priority data indicative of a priority assigned to the service.

5. The access point device of claim 1, wherein the service data comprises a delay sensitivity metric associated with the service representative of an extent to which the service is sensitive to a delay in provision of the service.

6. The access point device of claim 1, wherein the selecting the control plane device comprises selecting the control plane device based on category data indicative of a category to which the user equipment is determined to belong.

7. The access point device of claim 1, wherein the selecting the control plane device comprises selecting the control plane device based on load data indicative of a load associated with the control plane devices.

8. The access point device of claim 1, wherein the selecting the control plane device comprises selecting the control plane device based on performance data indicative of a performance metric associated with the control plane devices.

9. The access point device of claim 1, wherein the selecting the control plane device comprises selecting the control plane device based on policy data associated with the communication network.

10. The access point device of claim 1, wherein the selecting the control plane device comprises selecting the control plane device based on timing data associated with a round trip time for transmission of a message between the access point device and the control plane device.

11. The access point device of claim 1, wherein the selecting the control plane device comprises selecting the control plane device based on availability data indicative of an availability of the control plane devices.

12. The access point device of claim 1, wherein the selecting the control plane device comprises selecting the control plane device based on reliability data indicative of a reliability metric associated with the control plane devices.

13. The access point device of claim 1, wherein the selecting the control plane device comprises selecting the control plane device based on determined event data.

14. A method, comprising:
   determining, by an access point device comprising a processor, identifier data indicative of respective group identifiers assigned to control plane devices, of a communication network, that serve the access point device, wherein a group identifier of the respective group identifiers specifies a category of traffic handled by a group of the control plane devices, and wherein the identifier data is determined based on a result of polling the control plane devices; and
   based on the identifier data and service data associated with a service related to a user equipment that is to be served by the access point device, selecting, by the access point device, a control plane device of the control plane devices to facilitate control plane establishment for the service.

15. The method of claim 14, wherein the determining the identifier data comprises receiving the identifier data from a network management device of the communication network.

16. The method of claim 14, wherein the selecting the control plane device comprises selecting the control plane device based on event data associated with a defined area served by the control plane device.

17. The method of claim 14, wherein the user equipment comprises an Internet of things device and the selecting the control plane device comprises selecting the control plane device based on verifying that the control plane device is designated to serve Internet of things traffic.

18. A non-transitory machine-readable storage medium, comprising executable instructions that, when executed by a processor, facilitate performance of operations, comprising:
   determining identifier data indicative of respective group identifiers assigned to control plane devices, of a communication network, that serve an access point device, wherein a group identifier of the respective group identifiers is indicative of a category of traffic handled by a group of the control plane devices, and wherein the identifier data is determined based on respective results of polling the control plane devices; and
   based on the identifier data and service data associated with a service related to a user equipment that is to be served by the access point device, selecting a control plane device of the control plane devices to facilitate control plane establishment for the service.

19. The non-transitory machine-readable medium of claim 18, wherein the selecting comprises selecting the control plane device based on information that represents a traffic utilization of the control plane device.

20. The non-transitory machine-readable medium of claim 18, wherein the selecting comprises selecting the control plane device based on information that represents a capacity of the control plane device.

* * * * *